(12) United States Patent
Wang et al.

(10) Patent No.: US 11,580,717 B2
(45) Date of Patent: Feb. 14, 2023

(54) METHOD AND DEVICE FOR DETERMINING PLACEMENT REGION OF ITEM

(71) Applicant: BOE TECHNOLOGY GROUP CO., LTD., Beijing (CN)

(72) Inventors: Shu Wang, Beijing (CN); Hui Rao, Beijing (CN); Zhiguo Zhang, Beijing (CN); Xin Li, Beijing (CN); Xiaohong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 16/971,187

(22) PCT Filed: Dec. 16, 2019

(86) PCT No.: PCT/CN2019/125650
§ 371 (c)(1),
(2) Date: Aug. 19, 2020

(87) PCT Pub. No.: WO2020/140740
PCT Pub. Date: Jul. 9, 2020

(65) Prior Publication Data
US 2021/0117711 A1 Apr. 22, 2021

(30) Foreign Application Priority Data
Jan. 2, 2019 (CN) .......................... 201910001707.7

(51) Int. Cl.
*G06K 9/00* (2022.01)
*G06V 10/25* (2022.01)
(Continued)

(52) U.S. Cl.
CPC ............ *G06V 10/25* (2022.01); *G06V 10/242* (2022.01); *G06V 20/52* (2022.01); *G06V 10/62* (2022.01)

(58) Field of Classification Search
None
See application file for complete search history.

(56) References Cited

U.S. PATENT DOCUMENTS 7,609,855 B2 * 10/2009 Sada .......................... G06T 7/20
348/169
9,665,960 B1 * 5/2017 Masters .............. G06F 3/04817
(Continued)

FOREIGN PATENT DOCUMENTS

CN 103150670 A 6/2013
CN 103776441 A 5/2014
(Continued)

OTHER PUBLICATIONS

Hsiao et al., "P-113: Processing Technology and Application of a Bar Display based on TFT-LCDs." In SID Symposium Digest of Technical Papers, vol. 48, No. 1, pp. 1682-1685. 2017. (Year: 2017).*

*Primary Examiner* — Feng Niu
(74) *Attorney, Agent, or Firm* — The Webb Law Firm

(57) ABSTRACT

A method and a device for determining a placement region of an item are disclosed. The method according to the present disclosure comprises: acquiring position information of an electronic identification at a bar display screen; and determining the placement region of the item according to the position information and a preset mapping relationship.

18 Claims, 3 Drawing Sheets

(51) Int. Cl.
*G06V 10/24* (2022.01)
*G06V 20/52* (2022.01)
*G06V 10/62* (2022.01)

(56) References Cited

U.S. PATENT DOCUMENTS

| | | | |
|---|---|---|---|
| 2008/0122939 A1* | 5/2008 | Hirai | H04N 5/232127 |
| | | | 348/222.1 |
| 2009/0063306 A1 | 3/2009 | Fano et al. | |
| 2011/0081044 A1* | 4/2011 | Peeper | G06T 19/00 |
| | | | 382/103 |
| 2013/0155815 A1 | 6/2013 | Wulff et al. | |
| 2014/0009612 A1* | 1/2014 | King | G06V 10/17 |
| | | | 348/143 |
| 2015/0006245 A1* | 1/2015 | Kuusisto | G06V 20/52 |
| | | | 705/7.29 |
| 2015/0254499 A1* | 9/2015 | Pang | G06V 20/647 |
| | | | 382/103 |
| 2016/0328767 A1* | 11/2016 | Bonner | G06K 7/10861 |
| 2017/0178060 A1* | 6/2017 | Schwartz | G06V 10/44 |
| 2017/0193430 A1* | 7/2017 | Barreira Avegliano | |
| | | | G06V 20/00 |
| 2017/0193434 A1* | 7/2017 | Shah | G05D 1/0274 |
| 2017/0278056 A1 | 9/2017 | Itou et al. | |
| 2018/0204487 A1 | 7/2018 | Bao | |
| 2018/0349973 A1 | 12/2018 | Bonner et al. | |
| 2019/0156276 A1* | 5/2019 | Fisher | G06V 10/82 |
| 2019/0156277 A1* | 5/2019 | Fisher | G06Q 10/087 |
| 2019/0236530 A1* | 8/2019 | Cantrell | G06V 40/23 |
| 2019/0266652 A1 | 8/2019 | Bonner et al. | |
| 2020/0043192 A1* | 2/2020 | Zhang | G06V 20/52 |
| 2020/0118063 A1* | 4/2020 | Fu | G06T 7/55 |
| 2020/0327557 A1* | 10/2020 | Akgul | G06V 20/52 |
| 2020/0334620 A1* | 10/2020 | Yanagi | G06Q 30/06 |
| 2020/0394599 A1* | 12/2020 | Akatsuka | G06V 20/52 |

FOREIGN PATENT DOCUMENTS

| | | |
|---|---|---|
| CN | 104200348 A | 12/2014 |
| CN | 106203227 A | 12/2016 |
| CN | 106779518 A | 5/2017 |
| CN | 107735808 A | 2/2018 |
| CN | 108596530 A | 9/2018 |
| CN | 108712946 A | 10/2018 |
| CN | 109754209 A | 5/2019 |
| WO | 2018076990 A1 | 5/2018 |

* cited by examiner

METHOD AND DEVICE FOR DETERMINING PLACEMENT REGION OF ITEM

CROSS REFERENCE TO RELATED APPLICATIONS

This application is a U.S. National Stage Application of International Patent Application No. PCT/CN2019/125650 filed Dec. 16, 2019, and claims priority to Chinese Patent Application No. 201910001707.7 filed on Jan. 2, 2019, the disclosures of which are hereby incorporated by reference in their entirety.

TECHNICAL FIELD

The present disclosure relates to the technical field of electronic information, and particularly to a method and a device for determining a placement region of an item.

BACKGROUND

With the development of the society, the level of productivity also gradually increases. Under the current time, the quantity of storage in the warehouse also exponentially increases. For example, in the industry such as logistics and supermarket, the quantity of items in the warehouse reaches a level measured by millions or even tens of millions. For a large quantity of items, how to effectively place and manage the items at shelves has become an important issue in the field or industry.

At present, during a process of determining the placement region of the item, it is generally required to manually divide the placement region of the item by a manner such as performing of color marking, physical isolation using partitions, or the like in the region at the shelf, and to determine the placement region of the item after the dividing. However, in practical applications, during the process of determining the placement region manually by the manner such as the performing of the marking or the physical isolation in the region at the shelf, the process is complicated, and needs much time consumption, which affects the efficiency of the process of determining the placement region of the item at the shelf.

SUMMARY

In view of this, the present disclosure provides a method and a device for determining a placement region of an item, which aims to reduce time consumption in determining the placement region during a placement process, thereby improving the efficiency of determining the placement region of the item.

The aim of the present disclosure is realized by adopting the following technical solutions.

In a first aspect, the present disclosure provides a method for determining a placement region of an item, comprising:

acquiring position information of an electronic identification on a bar display screen; and determining the placement region of the item according to the position information and a preset mapping relationship.

According to some embodiments of the present disclosure, the position information comprises: a distance between same-side endpoint positions of adjacent electronic identifications, or a distance between center positions of the adjacent electronic identifications.

According to some embodiments of the present disclosure, the preset mapping relationship comprises:

a mapping relationship between the position information of the electronic identification and a first region at the bar display screen, and a mapping relationship between the first region at the bar display screen and the placement region of the item, wherein the first region indicates a specific position of the electronic identification at the bar display screen;

or, a mapping relationship between the position information of the electronic identification and the placement region of the item.

According to some embodiments of the present disclosure, the method further comprises:

updating, when a change in the position information of the electronic identification is detected, the position information of the changed electronic identification; and determining the placement region of the item corresponding to the changed electronic identification.

According to some embodiments of the present disclosure, after determining the placement region of the item corresponding to the changed electronic identification, the method further comprises:

resetting a display region and a display content of the electronic identification at the bar display screen according to the placement region of the item corresponding to the changed electronic identification and item information corresponding to the changed electronic identification, and displaying the updated electronic identification at the bar display screen.

According to some embodiments of the present disclosure, the item information comprises any one of an item name, an item price, an item picture, advertisement information or any combination thereof.

According to some embodiments of the present disclosure, the method further comprises:

comparing information of an actual placement region of the item with the placement region of the item to judge whether the two are consistent with each other;

if the information of the actual placement region of the item is consistent with the placement region of the item, determining that the placement region of the item is correct, otherwise, determining that the placement region of the item is wrong.

According to some embodiments of the present disclosure, the method further comprises:

controlling a camera device to perform image extraction to acquire the information of the actual placement region of the item.

In a second aspect, the present disclosure provides a device for determining a placement region of an item, comprising:

an acquiring circuit configured to acquire position information of an electronic identification at a bar display screen; and a first determining circuit configured to determine the placement region of the item according to the position information and a preset mapping relationship.

According to some embodiments of the present disclosure, the position information comprises: a distance between same-side endpoint positions of adjacent electronic identifications, or a distance between center positions of the adjacent electronic identifications.

According to some embodiments of the present disclosure, the preset mapping relationship comprises:

a mapping relationship between the position information of the electronic identification and a first region at the bar display screen, and a mapping relationship between the first region at the bar display screen and the placement region of the item, wherein the first region indicates a specific position of the electronic identification at the bar display screen;
or, a mapping relationship between the position information of the electronic identification and the placement region of the item.

According to some embodiments of the present disclosure, the device further comprises:

an updating circuit configured to update, when a change in the position information of the electronic identification is detected, the position information of the changed electronic identification; and a second determining circuit configured to determine the placement region of the item corresponding to the changed electronic identification.

According to some embodiments of the present disclosure, the device further comprises:

a setting circuit configured to reset a display region and a display content of the electronic identification at the bar display screen according to the placement region of the item corresponding to the changed electronic identification and item information corresponding to the changed electronic identification, and display the updated electronic identification at the bar display screen.

According to some embodiments of the present disclosure, the item information comprises any one of an item name, an item price, an item picture, advertisement information or any combination thereof.

According to some embodiments of the present disclosure, the device further comprises:

a judging circuit configured to compare information of an actual placement region of the item with the placement region of the item to judge whether the two are consistent with each other;

a third determining circuit configured to, if the information of the actual placement region of the item is consistent with the placement region of the item, determine that the placement region of the item is correct, otherwise, determine that the placement region of the item is wrong.

According to some embodiments of the present disclosure, the device further comprises:

a control circuit configured to control a camera device to perform image extraction to acquire the information of the actual placement region of the item.

In a third aspect, the present disclosure provides a storage medium having stored thereon instructions, which are adapted to be loaded by a processor and perform the method for determining the placement region of the item according to the first aspect.

In a fourth aspect, the present disclosure provides an electronic device comprising a storage medium and a processor; wherein the processor is adapted to implement instructions;

the storage medium is adapted to store the instructions; and the instructions are adapted to be loaded by the processor and perform the method for determining the placement region of the item according to the first aspect.

By means of the above technical solutions, in the method and the device for determining a placement region of an item provided by the present disclosure, in view of the problem that in the prior art, during the process of dividing the placement region manually by the manner such as the performing of marking or physical isolation in the region at the shelf, the process is complicated and needs much time consumption, which affects the efficiency of determining the placement region of the item, the present disclosure can acquire the position information of the electronic identification at the bar display screen, and then determine the placement region of the item according to the position information and a preset mapping relationship. The function of automatically determining the placement region of the item according to the electronic identification avoids the time required for operations such as the manual performing of the marking or the physical isolation during the process of determining the placement region of the item, thereby reducing the time consumption for setting the placement region and improving the efficiency of determining the placement region of the item. In addition, according to the method provided by the present disclosure, manual operation is not needed during the process of determining the placement region, so that the labor consumption during the process of color marking or partition setting is avoided, and the labor cost is saved.

The foregoing description is only a summary of the technical solutions of the present disclosure, and the embodiments of the present disclosure are described below in order that the technical means of the present disclosure can be clearly learned so as to be implemented in accordance with the contents of the specification, and the foregoing and other objects, features, and advantages of the present disclosure can be more clearly understood.

BRIEF DESCRIPTION OF THE DRAWINGS

Further advantages and benefits of the present disclosure will become apparent to those skilled in the art from the following detailed description of exemplary embodiments. The drawings are provided only for the purpose of illustrating the exemplary embodiments and are not construed as limiting the present disclosure. Also, like reference numerals are used to represent like parts throughout the drawings. In the drawings.

DETAILED DESCRIPTION

Figure 1:
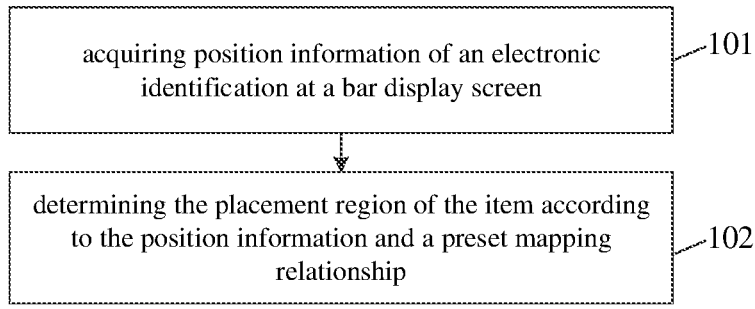
FIG. 1 shows a flowchart of a method for determining a placement region of an item provided by an embodiment of the present disclosure.

Various exemplary embodiments of the present disclosure will be described in detail with reference to the accompanying drawings in the following. While the exemplary embodiments of the present disclosure are shown in the drawings, it should be understood that the present disclosure may be implemented in various forms and should not be limited by the embodiments described herein. Rather, these embodiments are provided merely for understanding the present disclosure thoroughly and completely, and sufficiently expressing the scope of the present disclosure to one of ordinary skill in the art.

An embodiment of the present disclosure provides a method for determining a placement region of an item, and as shown in FIG. 1, the method may comprise:

101: acquiring position information of an electronic identification at a bar display screen.

The electronic identification may be displayed at the bar display screen. In the embodiment of the present disclosure, during the process of determining the placement region of the item, the placement position of the item may be determined by the electronic identification of the item. For example, according to the method in the step 101, the position of the electronic identification at the bar display screen may be acquired first, that is, the position information of the electronic identification is acquired. For example, the electronic identification of the item displayed at the bar display screen can be collected by a preset camera, and the position information of the electronic identification at the bar display screen is determined; or coordinates of the electronic identification at the bar display screen can be acquired by an electronic system connected with the bar display screen, whereby acquiring the position information of the electronic identification at the bar display screen. In the step 101, a form, a category, a number and a setting mode of the content in the electronic identification are not limited herein, and may be selected according to actual needs.

For example, information such as a name of the item, a category of the item, or a package parameter of the item may be displayed in the electronic identification. In addition, the electronic identification can be specifically set in the electronic system connected with the bar display screen, or when the bar display screen is a touch screen, the electronic identification can be set at the bar display screen.

102: determining the placement region of the item according to the position information and a preset mapping relationship.

After the position information of the electronic identification is acquired in the step 101, the placement region of the item may also be determined according to the position information. For example, in the step 102, the placement region of the item may be determined according to a preset mapping relationship. For example, the preset mapping relationship may include related information such as volume information, an area of the placement corresponding to the item. In this way, after the position information of the electronic identification at the bar display screen is acquired in the step 101, the information such as a volume of the placement or the area of the placement for the corresponding item can be determined according to the preset mapping relationship, so as to determine a region where the item needs to be placed, namely the placement region.

For example, the preset mapping relationship may be stored in a preset database, and detailed parameters such as the volume, the area of the placement, or the like of different items may be stored in the preset mapping relationship, and corresponding parameters of the item may be also queried in the preset database based on the name or the identification of the item included in the item information. Note that, the process of determining the item volume of the item may be based on the above manner, but is not limited to the above manner, and a corresponding manner may be selected according to actual needs. Of course, in the embodiment of the present disclosure, the content included in the preset mapping relationship may include, but is not limited to, the above manner, and may also be set according to actual needs. For example, when the preset mapping relationship may include a mapping relationship between the position information of the electronic identification and the placement region of the item, the placement region of the item may be directly determined according to the preset mapping relationship after the position information of the electronic identification is acquired.

In addition, in the embodiment of the present disclosure, after the placement region of the item is determined, a display region corresponding to the placement region may be further displayed at the bar display screen corresponding to the placement region. In addition, in order to avoid the process of manual marking or partition setting or the like and to save the time consumption during the process of setting the placement region, in this step 102, a corresponding placement region may be set according to the volume of the item and the position where the item is to be placed, and the display region corresponding to the placement region is displayed at the bar display screen, wherein the display mode may be a region frame in an electronic form, or a rectangular mark with a color being displayed at the position where the item can be placed. Here, the display mode includes, but is not limited to, the above modes, and for example, the display mode may be selected according to actual needs of a user.

In the method for determining the placement region of the item provided by the embodiment of the present disclosure, in view of the problem that in the prior art, during the process of dividing the placement region manually by the manner of performing of the marking or the physical isolation in the region at the shelf, the process is complicated and needs much time consumption, which affects the efficiency of determining the placement region of the items, the present disclosure can acquire position information of the electronic identification at the bar display screen, and then determine the placement region of the item according to the position information and a preset mapping relationship. The function of automatically determining the placement region of the item according to the electronic identification avoids the time required for operations such as manual performing of the marking or the physical isolation during the process of determining the placement region of the item, thereby reducing the time consumption for setting the placement region and improving the efficiency of determining the placement region of the item. In addition, according to the method provided by the present disclosure, manual operation is not needed during the process of determining the placement region, so that the labor consumption during the process of color marking or partition setting is avoided, and the labor cost is saved.

Figure 2:
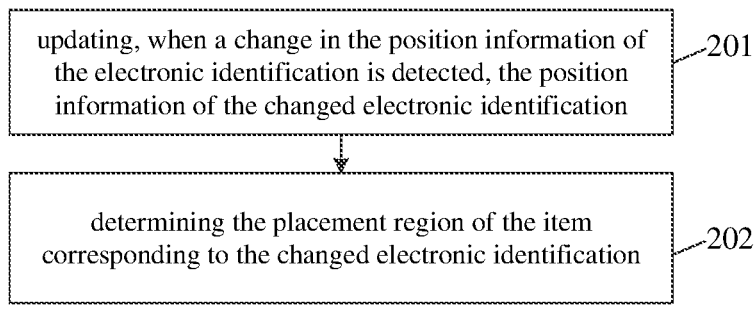
FIG. 2 shows a flowchart of another method for determining a placement region of an item provided by an embodiment of the present disclosure.

Further, according to the method as shown in FIG. 1, after the placement region of the item is determined according to the position information and the preset mapping relationship, there may be a situation that the position of the item changes after the placement in an actual application. On this basis, another embodiment of the present disclosure further provides another method for determining a placement region of an item, and as shown in FIG. 2, the method mainly comprises:

201: updating, when a change in the position information of the electronic identification is detected, the position information of the changed electronic identification.

In the embodiment of the present disclosure, the position information of the electronic identification may be detected in real time, for example, the situation whether the change in the electronic identification is detected may be determined by detecting whether the position information of the electronic identification is changed. When a change in the electronic identification is detected, it shows that the item in the current placement region possibly changes. For example, the updating mode may correspond to an actual setting mode of the electronic identification that is actually set. For example, when the position information includes a serial number of the bar display screen and a relative position from the adjacent electronic identification at the bar display screen, and there is a possibility that the electronic identification may be changed from the original position to another display screen after the change, and thus it may be determined in this step 201 whether the changed electronic identification is still located at the original bar display screen. If the electronic identification is still located at the original bar display screen, it shows that the electronic identification is not changed to another bar display screen, and thus it is only necessary to update its relative position from the adjacent electronic identification at the bar display screen. Otherwise, when it is determined that the electronic identification has been changed from the original bar display screen to another bar display screen, it is necessary to update the serial number of the display screen for the changed electronic identification, and to update the relative position from the adjacent electronic identification at the bar display screen.

In addition, the process of updating the relative position of the changed electronic identification at the bar display screen may be performed, for example, as follows: detecting coordinates of the electronic identification at the bar display screen by an electronic system connected with the bar display screen, whereby acquiring real-time position information of the electronic identification at the bar display screen. When a change in the coordinates of the electronic identification is detected, the electronic system updates the position information of the electronic identification by updating the coordinates of the changed electronic identification.

202: determining the placement region of the item corresponding to the changed electronic identification.

When a change in the electronic identification is detected, since the position of the electronic identification from the adjacent electronic identification may change after the change, and meanwhile the placement region of the item may also change, in order to ensure the accuracy of the placement region, the placement region of the item may be re-determined according to the changed electronic identification in the embodiment of the present disclosure.

Figure 3:
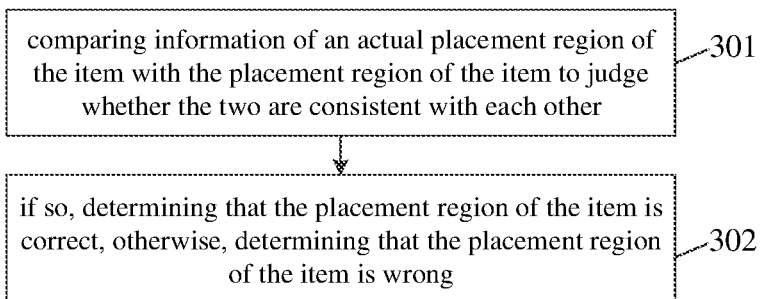
FIG. 3 shows a flowchart of still another method for determining a placement region of an item provided by an embodiment of the present disclosure.

Further, according to the method as shown in FIG. 1, since different items are placed in different regions, after the placement region of the item is determined and the item is placed, it can be detected whether the placed item is placed correctly, and thus still another embodiment of the present disclosure provides still another method for determining a placement region of an item, and as shown in FIG. 3, the method mainly comprises:

301: comparing information of an actual placement region of the item with the placement region of the item to judge whether the two are consistent with each other.

In order to ensure the detection of whether the item is placed accurately after the item is placed, in the embodiment of the present disclosure, according to the method as described in the step 301, when verification information for determining the item placement region is received, the item name of the item to be verified can be determined according to the information, and then an electronic identification actually corresponding to the item name and a corresponding bar display screen are determined. Because the placement regions of different items are different, the actual placement region of the item can be compared with the placement region corresponding to the electronic identification corresponding to the currently determined item name, to determine whether the two are consistent with each other. In addition, before the actual placement region is compared with the placement region of the item, image extraction can be performed by controlling a camera device so as to acquire information of the actual placement region of the item.

302: if so, determining that the placement region of the item is correct, otherwise, determining that the placement region of the item is wrong.

Through the judgment in the step 301, when the information of the actual placement region of the item is consistent with the placement region of the item, it shows that the item placed at the current placement region is the same item as the item to be placed, and it is determined that the placement region of the item is correct; otherwise, it shows that the two are not same, and it is determined that the placement region of the item is wrong.

Thus, by verifying whether the placement of the item is correct by comparing the actual placement region of the item with the placement region of the item, and judging whether the placement region of the item corresponding to the electronic identification is consistent with the actual placement region of the item, the function of verifying whether the placement of the item is correct according to the placement region of the item is achieved and the efficiency of verification is improved.

Figure 4:
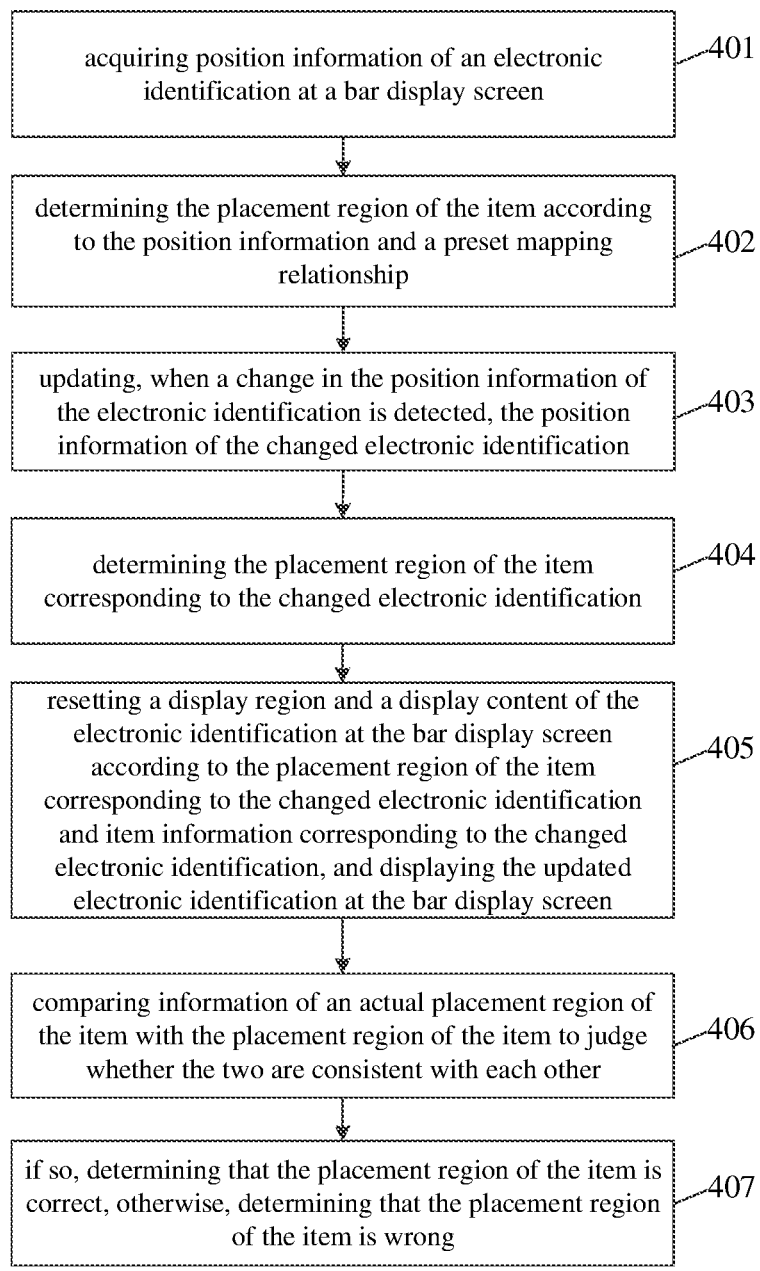
FIG. 4 shows a flowchart of yet another method for determining a placement region of an item provided by an embodiment of the present disclosure.

Further, according to the method as shown in FIG. 1, yet another embodiment of the present disclosure provides yet another method for determining a placement region of an item, and as shown in FIG. 4, the method mainly comprises:

401: acquiring the position information of the electronic identification at the bar display screen.

For example, the position information may comprise: a distance between same-side endpoint positions of adjacent electronic identifications, or a distance between center positions of the adjacent electronic identifications.

In the embodiment of the present disclosure, the position information may be understood as a relative position of the current electronic identification, from electronic identifications to which both sides of the current electronic identification are adjacent, at the bar display screen. For example, the judgment of the relative position may be selected according to actual needs. For example, when a distance between same-side endpoints is selected as the position information, a distance between left-side endpoints of two adjacent electronic identifications may be selected as the position information, or a distance between center positions of the two adjacent electronic identifications may also be selected as the position information. Here, a specific position information may be selected according to any of the above manners, and is not limited specifically herein, only if it is ensured that the selected manner can accurately determine the position information of the electronic identification to be acquired currently.

402: determining the placement region of the item according to the position information and a preset mapping relationship.

In an embodiment of the present disclosure, the preset mapping relationship may comprise: a) a mapping relationship between the position information of the electronic identification and a first region at the bar display screen and a mapping relationship between the first region at the bar display screen and the placement region of the item; or b) a mapping relationship between the position information of the electronic identification and the placement region of the item.

When the preset mapping relationship is a), the first region may be understood as a specific position of the electronic identification at the bar display screen. When the position information acquired in the previous step 401 is a relative distance between the current electronic identification and an adjacent electronic identification, the specific position of the current electronic identification at the bar display screen may be determined according to the preset mapping relationship. In addition, since the preset mapping relationship further comprises a mapping relationship between the first region and the placement region of the item, the method according to the step 402 may determine, according to the currently determined specific position of the electronic identification at the bar display screen, the placement region required by the item corresponding to the electronic identification. For example, during the process of determining the placement region, the mapping relationship may comprise a size required for placing the item corresponding to the electronic identification, so that the accuracy in determining the placement region of the item according to the preset mapping relationship can be ensured.

On the other hand, when the preset mapping relationship is b), after the position information of the electronic identification is acquired in the previous step 401, the placement region of the item corresponding to the position information may be directly determined according to the mapping relationship, wherein the preset mapping relationship may comprise the placement region corresponding to any of the items. When the relative distance between the electronic identification corresponding to the item and the adjacent electronic identification is acquired in the previous step 401, the corresponding placement region may be directly set at the position of the electronic identification according to the preset mapping relationship. In this way, during the process of determining the placement region of the item, the placement region required by the item corresponding to the electronic identification can be directly determined according to preset mapping relationship.

403: updating, when a change in the position information of the electronic identification is detected, the position information of the changed electronic identification.

During an actual operation, it is possible to adjust and change the placed item; in order to make the determination of the placement region of the item more accurate, and because there is a correspondence between the electronic identification and the determined placement region of the item, in the embodiment of the present disclosure, real-time detection may be performed according to the method of the step 403, to determine, by detecting whether the position information of the electronic identification changes, the situation whether a change in the electronic identification is detected. When a change in the electronic identification is detected, it shows that the item at the current placement region also possibly changes. For this reason, the embodiment of the present disclosure may first identify the changed electronic identification, and determine the position information of the changed electronic identification, and then update the position information of the electronic identification to the changed position information. For example, the updating mode may correspond to the actual setting mode of the electronic identification that is actually set. For example, when the position information comprises a serial number of the bar display screen and a relative position from an adjacent electronic identification at the bar display screen, and there is a possibility that the electronic identification may be changed from the original position to another display screen after the change, and thus it may be first determined in the step 403 whether the changed electronic identification is still located at the original bar display screen. If the electronic identification is still located at the original bar display screen, it shows that the electronic identification is not changed to another bar display screen, so that it is only necessary to update its relative position from the adjacent electronic identification at the bar display screen. Otherwise, when it is determined that the electronic identification has already changed from the original bar display screen to another bar display screen, it is necessary to update the serial number of the display screen for the changed electronic identification, and to update the relative position from the adjacent electronic identification at the bar display screen.

Therefore, by judging whether the changed electronic identification is still located at the original bar display screen and updating the relative position of the changed electronic identification from the adjacent electronic identification at the bar display screen when it is determined that the changed electronic identification is still located at the original bar display screen, the process of updating the serial number of the bar display screen in the position information of the electronic identification can be avoided, which reduces steps of the operation and can improve the efficiency of updating. In addition, when it is determined that the changed electronic identification is not located at the original bar display screen, the serial number of the display screen for the changed electronic identification is updated, and the relative position from the adjacent electronic identification at the bar display screen is updated, so that it is possible to ensure the accuracy of the updated result, to avoid the problem of a position error caused by the fact that the serial number of the bar display screen in the position information is not updated when the position of the bar display screen where the electronic identification is located is changed, and to improve the accuracy in the determination of the placement region of the item.

For example, the process of updating the relative position of the changed electronic identification at the bar display screen may be performed as follows: firstly, the current position of the changed electronic identification is acquired by a camera, and then the relative position of the changed electronic identification from the adjacent electronic identification at the bar display screen is re-determined according to the current position, and finally the original relative position is updated according to the re-determined relative position from the adjacent electronic identification. In this way, by acquiring the current position of the changed electronic identification by the camera, re-determining the relative position of the changed electronic identification at the bar display screen according to the current position, and updating the original relative position from the adjacent electronic identification according to the re-determined relative position from the adjacent electronic identification, the position information of the electronic identification can be updated with the actual position acquired by the camera, and the accuracy of the updated result is improved.

In addition, the updating of the serial number of the display screen for the changed electronic identification may be performed as follows: first determining, by a camera, the bar display screen where the changed electronic identification is currently located, and then acquiring information of the serial number of the bar display screen, and finally updating the serial number of the bar display screen for the changed electronic identification according to the information of the serial number. In this way, by determining, by the camera, the bar display screen where the changed electronic identification is currently located, acquiring the information of the serial number of the bar display screen, and then updating the serial number of the bar display screen for the changed electronic identification according to the information of the serial number, the position information of the electronic identification can be updated with the serial number of the bar display screen where the actual electronic identification is located, which is acquired by the camera, and the accuracy of an updated result is ensured.

According to some embodiments of the present disclosure, the process of updating the relative position of the changed electronic identification at the bar display screen may be further performed, for example, as follows: detecting coordinates of the electronic identification at the bar display screen by an electronic system connected with the bar display screen, whereby acquiring real-time position information of the electronic identification at the bar display screen. When a change in the coordinates of the electronic identification is detected, the electronic system updates the coordinates of the changed electronic identification to update the position information of the electronic identification.

404: determining the placement region of the item corresponding to the changed electronic identification.

Based on the method in the previous step 403, when a change in the electronic identification is detected, since the position of the electronic identification from the adjacent electronic identification may be changed after the change and the placement region of the item may also be changed, in the embodiment of the present disclosure, the placement region of the item may be re-determined according to the changed electronic identification.

405: resetting a display region and a display content of the electronic identification at the bar display screen according to the placement region of the item corresponding to the changed electronic identification and item information corresponding to the changed electronic identification, and displaying the updated electronic identification at the bar display screen.

For example, the item information comprises any one of an item name, an item price, an item picture, advertisement information or any combination thereof. Since the implementation described in the embodiments of the present disclosure are implemented based on the bar display screen, in order to facilitate subsequent placement of the item, in this step 405, after the placement region of the changed electronic identification is determined in the previous step 404, the display region of the electronic identification at the bar display screen and the item information corresponding to the changed electronic identification may be reset.

406: comparing information of the actual placement region of the item with the placement region of the item to judge whether the two are consistent with each other.

In the embodiment of the present disclosure, in order to ensure the determination and verification of the accuracy after the placement of the item, when the verification information for determining the placement region of the item is received, according to the method as described in the step 406, the item name of the item to be verified can be determined according to the information, and then the electronic identification actually corresponding to the item name and the corresponding bar display screen are determined. Since the placement regions of different items are different, the actual placement region of the item can be compared with the placement region corresponding to the electronic identification corresponding to the currently determined item name, to determine whether the two are consistent with each other.

Further, in the embodiment of the present disclosure, before comparing the actual placement region with the placement region of the item, image extraction can be performed by controlling the camera device, so as to acquire the information of the actual placement region of the item.

407: if so, determining that the placement region of item is correct, otherwise, determining that the placement region of the item is wrong.

Through the judgment of the step 406, when the two are consistent with each other, it shows that the item placed at the current placement region is the same item as the item to be placed, and it is determined that the placement region of the item is correct; otherwise, it shows that the two are not same, and it is determined that the placement region of the item is wrong.

Thus, by verifying whether the placement of the item is correct by comparing the actual placement region of the item with the placement region of the item and judging whether the placement region of the item corresponding to the electronic identification is consistent with the actual placement region of the item, the function of verifying whether the placement of the item is correct according to the placement region of the item is achieved and the efficiency of verification is improved.

Figure 5:
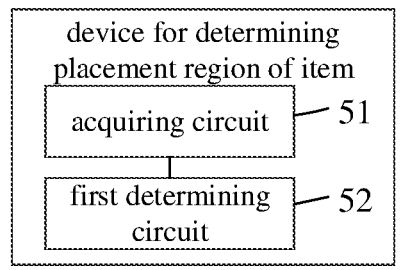
FIG. 5 shows a block diagram of a device for determining a placement region of an item provided by the embodiment of the present disclosure.

Further, according to the embodiments of the above method, another embodiment of the present disclosure provides a device for determining a placement region of an item, and as shown in FIG. 5, the device mainly comprises:

an acquiring circuit 51 configured to acquire position information of an electronic identification at a bar display screen;

a first determining circuit 52 configured to determine the placement region of the item according to the position information acquired by the acquiring circuit 51 and a preset mapping relationship.

Figure 6:
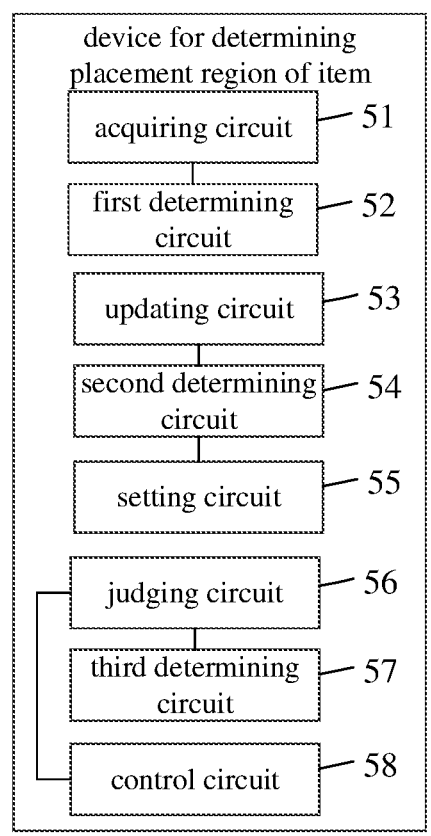
FIG. 6 shows a block diagram of another device for determining a placement region of an item provided by an embodiment of the present disclosure.

According to some embodiments of the present disclosure, as shown in FIG. 6, the position information comprises: a distance between same-side endpoint positions of adjacent electronic identifications, or a distance between center positions of the adjacent electronic identifications.

According to some embodiments of the present disclosure, as shown in FIG. 6, the preset mapping relationship comprises:

a mapping relationship between the position information of the electronic identification and a first region at the bar display screen and a mapping relationship between the first region at the bar display screen and the placement region of the item;

or, a mapping relationship between the position information of the electronic identification and the placement region of the item.

According to some embodiments of the present disclosure, as shown in FIG. 6, the device further comprises:

an updating circuit 53 configured to update, when a change in the position information of the electronic identification is detected, the position information of the changed electronic identification;

a second determining circuit 54 configured to determine the placement region of the item corresponding to the changed electronic identification according to the position information of the changed electronic identification updated by the updating circuit 53.

According to some embodiments of the present disclosure, as shown in FIG. 6, the device further comprises:

a setting circuit 55 configured to reset a display region and a display content of the electronic identification at the bar display screen according to the placement region of the item corresponding to the changed electronic identification determined by the second determining circuit 54 and item information corresponding to the changed electronic identification, and display the updated electronic identification at the bar display screen.

According to some embodiments of the present disclosure, as shown in FIG. 6, the item information comprises any one of an item name, an item price, an item picture, advertisement information or any combination thereof.

According to some embodiments of the present disclosure, as shown in FIG. 6, the device further comprises:

a judging circuit 56 configured to compare information of an actual placement region of the item with the placement region of the item to judge whether the two are consistent with each other;

a third determining circuit 57 configured to, if it is judged that the information of the actual placement region of the item is consistent with the placement region of the item, determine that the placement region of the item is correct, otherwise, determine that the placement region of the item is wrong.

According to some embodiments of the present disclosure, as shown in FIG. 6, the device further comprises:

a control circuit 58 configured to control the camera device to perform image extraction so as to acquire the information of the actual placement region of the item, so that the judging circuit 56 performs the comparison according to the information of the actual placement region of the item.

By means of the solutions as described in the above embodiments, the embodiments of the present disclosure provide a method and a device for determining a placement region of an item, and in view of the problem that in the prior art, during the process of dividing the placement region manually by the manner such as the performing of the marking or the physical isolation in the region at the shelf, the process is complicated and needs much time consumption, which affects the efficiency of determining the placement region of the item, the invention can acquire position information of the electronic identification at the bar display screen, and then determine the placement region of the item according to the position information and a preset mapping relationship. The function of automatically determining the placement region of the item according to the electronic identification avoids the time required for operations such as manual performing of the marking or the physical isolation during the process of determining the placement region of the item, thereby reducing the time consumption for setting the placement region and improving the efficiency of determining the placement region of the item. In addition, according to the method provided by the present disclosure, manual operation is not needed during the process of determining the placement region, so that the labor consumption during the process of color marking or partition setting is avoided, and the labor cost is saved.

Further, according to the embodiments of the above method, another embodiment of the present disclosure also provides a storage medium having stored thereon instructions, which are adapted to be loaded by a processor and perform the above method for determining a placement region of an item.

The instructions in the storage medium for determining the placement region of the item provided by the embodiment of the present disclosure can acquire the position information of the electronic identification at the bar display screen, and then determine the placement region of the item according to the position information and a preset mapping relationship. The function of automatically determining the placement region of the item according to the electronic identification avoids the time required for operations such as manual performing of the marking or the physical isolation during the process of determining the placement region of the item, thereby reducing the time consumption for setting the placement region and improving the efficiency of determining the placement region of the item. In addition, according to the method provided by the present disclosure, manual operation is not need during the process of determining the placement region, so that the labor consumption during the process of color marking or partition setting is avoided, and the labor cost is saved.

Further, according to the embodiments of the above method, another embodiment of the present disclosure also provides an electronic device comprising a storage medium and a processor; wherein the processor is adapted to implement instructions;

the storage medium is adapted to store the instructions; and the instructions are adapted to be loaded by the processor and to perform the method for determining the placement region of the item as described above.

The electronic device for determining the placement region of the item provided by the embodiment of the present disclosure can acquire position information of the electronic identification at the bar display screen, and then determine the placement region of the item according to the position information and a preset mapping relationship. The function of automatically determining the placement region of the item according to the electronic identification avoids the time required for operations such as manual performing of the marking or the physical isolation during the process of determining the placement region of the item, thereby reducing the time consumption for setting the placement region and improving the efficiency of determining the placement region of the item. In addition, according to the method provided by the present disclosure, manual operation is not need during the process of determining the placement region, so that the labor consumption during the process of color marking or partition setting is avoided, and the labor cost is saved.

In the foregoing embodiments, the descriptions of the respective embodiments have respective emphasis, and for portions that are not described in detail in a certain embodiment, reference may be made to the related descriptions of other embodiments.

Various component embodiments of the present disclosure may be implemented in hardware, or in software modules running on one or more processors, or in a combination thereof. Those skilled in the art will appreciate that a microprocessor or a Digital Signal Processor (DSP) may be used in practice to implement some or all of the functions of some or all of the components of the method and the device for determining the placement region of the item according to the embodiments of the present disclosure. The present disclosure may also be implemented as an apparatus or device program (e.g., a computer program and a computer program product) for performing a portion or all of the methods as described herein. Such a program implementing the present disclosure may be stored on a computer-readable medium or may be in the form of one or more signals. Such a signal may be downloaded from an internet website, or may be provided on a carrier signal, or may be provided in any other form.

It should be noted that the above embodiments illustrate rather than limit the present disclosure, and that those skilled in the art could design alternative embodiments without departing from the scope of the appended claims. In the claims, any reference signs placed between parentheses shall not be construed as limiting the claims. The word "comprise" does not exclude the presence of elements or steps not listed in the claims. The word "a" or "an" preceding an element does not exclude the presence of a plurality of such elements. The invention can be implemented by means of hardware comprising several distinct elements, and by means of a suitably programmed computer. In a unit claim enumerating several means, several of these means can be embodied by the same one hardware element. The usage of the words of first, second, third and the like do not indicate any ordering. These words may be interpreted as names.

What is claimed is:

1. A method for determining a placement region of an item, the method comprising:
   acquiring position information related with a position where an electronic identification of the item is displayed at a bar display screen; and
   determining the placement region of the item according to the position information and a preset mapping relationship, the placement region refers to an actual place where the item is to be placed.

2. The method according to claim 1, wherein the position information comprises: a distance between same-side endpoint positions of adjacent electronic identifications, or a distance between center positions of the adjacent electronic identifications.

3. The method according to claim 1, wherein the preset mapping relationship comprises:
   a mapping relationship between the position information of the electronic identification and a first region at the bar display screen, and a mapping relationship between the first region at the bar display screen and the placement region of the item, wherein the first region indicates a specific position of the electronic identification at the bar display screen;
   or,
   a mapping relationship between the position information of the electronic identification and the placement region of the item.

4. The method according to claim 1, further comprising:
   updating, when a change in the position information of the electronic identification is detected, the position information of the changed electronic identification; and
   determining the placement region of the item corresponding to the changed electronic identification.

5. The method according to claim 4, wherein, after determining the placement region of the item corresponding to the changed electronic identification, the method further comprises:
   resetting a display region and a display content of the electronic identification at the bar display screen according to the placement region of the item corresponding to the changed electronic identification and item information corresponding to the changed electronic identification, and displaying the updated electronic identification at the bar display screen.

6. The method according to claim 5, wherein the item information comprises any one of an item name, an item price, an item picture, advertisement information or any combination thereof.

7. The method according to claim 1, further comprising:
   comparing information of an actual placement region of the item with the placement region of the item to judge whether the two are consistent with each other;
   if the information of the actual placement region of the item is consistent with the placement region of the item, determining that the placement region of the item is correct, otherwise, determining that the placement region of the item is wrong.

8. The method according to claim 7, further comprising:
   controlling a camera device to perform image extraction to acquire the information of the actual placement region of the item.

9. A device for determining a placement region of an item, the device comprising:
   an acquiring circuit configured to acquire position information related with a position where an electronic identification of the item is displayed at a bar display screen; and
   a first determining circuit configured to determine the placement region of the item according to the position information and a preset mapping relationship, the placement region refers to an actual place where the item is to be placed.

10. The device according to claim 9, wherein the position information comprises: a distance between same-side endpoint positions of adjacent electronic identifications, or a distance between center positions of the adjacent electronic identifications.

11. The device according to claim 9, wherein the preset mapping relationship comprises:
    a mapping relationship between the position information of the electronic identification and a first region at the bar display screen, and a mapping relationship between the first region at the bar display screen and the placement region of the item, wherein the first region indicates a specific position of the electronic identification at the bar display screen;
    or,
    a mapping relationship between the position information of the electronic identification and the placement region of the item.

12. The device according to claim 9, the device further comprising:
    an updating circuit configured to update, when a change in the position information of the electronic identification is detected, the position information of the changed electronic identification; and
    a second determining circuit configured to determine the placement region of the item corresponding to the changed electronic identification.

13. The device according to claim 12, the device further comprising:
    a setting circuit configured to reset a display region and a display content of the electronic identification at the bar display screen according to the placement region of the item corresponding to the changed electronic identification and item information corresponding to the changed electronic identification, and display the updated electronic identification at the bar display screen.

14. The device according to claim 13, wherein the item information comprises any one of an item name, an item price, an item picture, advertisement information or any combination thereof.

15. The device according to claim 9, the device further comprising:
- a judging circuit configured to compare information of an actual placement region of the item with the placement region of the item to judge whether the two are consistent with each other;
- a third determining circuit configured to, if the information of the actual placement region of the item is consistent with the placement region of the item, determine that the placement region of the item is correct, otherwise, determine that the placement region of the item is wrong.

16. The device according to claim 15, the device further comprising:
- a control circuit configured to control a camera device to perform image extraction to acquire the information of the actual placement region of the item.

17. A non-transitory storage medium having stored thereon instructions, which are adapted to be loaded by a processor and perform the method for determining the placement region of the item according to claim 1.

18. An electronic device comprising a storage medium and a processor; wherein
- the processor is adapted to implement instructions;
- the storage medium is adapted to store the instructions; and
- the instructions are adapted to be loaded by the processor and perform the method for determining the placement region of the item according to claim 1.

* * * * *